A. E. OLANDER.
AUTOMOBILE ATTACHMENT.
APPLICATION FILED APR. 23, 1920.
1,356,395.
Patented Oct. 19, 1920.
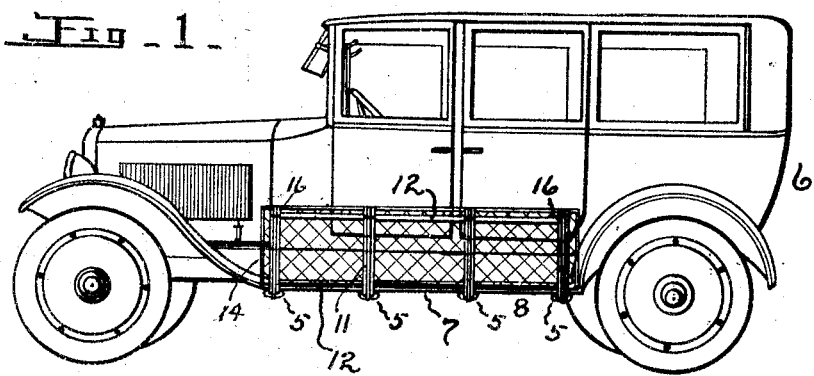
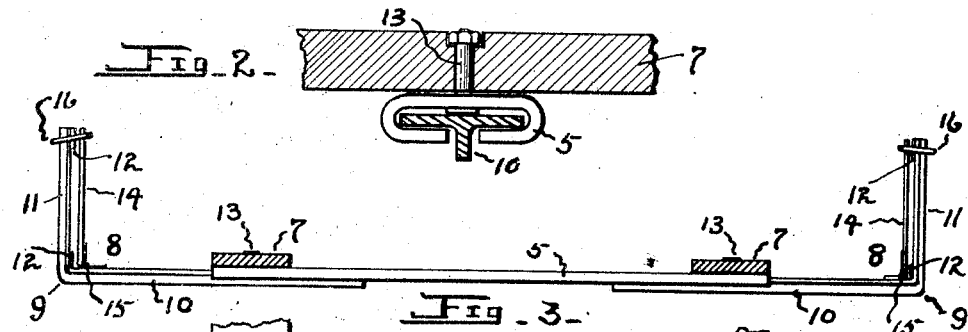
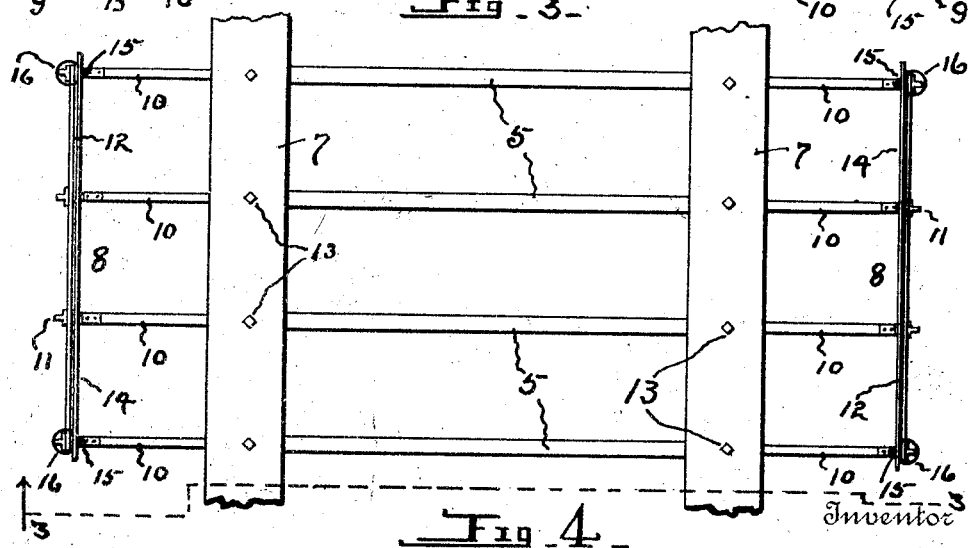
Inventor
Axel E. Olander,
By Hiram A. Sturges,
Attorney

UNITED STATES PATENT OFFICE.

AXEL E. OLANDER, OF OMAHA, NEBRASKA.

AUTOMOBILE ATTACHMENT.

1,356,395.

Specification of Letters Patent.

Patented Oct. 19, 1920.

Application filed April 23, 1920. Serial No. 376,078.

*To all whom it may concern:*

Be it known that I, AXEL E. OLANDER, a citizen of the United States, residing at Omaha, in the county of Douglas and State of Nebraska, have invented certain new and useful Improvements in Automobile Attachments, of which the following is a specification.

This invention relates to an automobile attachment, and has for its object, broadly, to provide supports below the floor and running-boards of a motor vehicle which will be extensible and removable, for use as a package carrier, and for other purposes.

The invention consists of the novel construction, combination and arrangement of parts as described herein and claimed, and as illustrated in the accompanying drawing, wherein—

Figure 1 is a side view of a motor vehicle, showing the attachment applied. Fig. 2 is a view showing a part of a running-board in longitudinal section and an end view of a sheath, also showing an extensible bar in transverse section. Fig. 3 is a sectional view on line 3—3 of Fig. 4. Fig. 4 is a plan view of certain sheaths and extensible bars, a pair of running-boards, broken away, also being shown.

Referring now to the drawing for a more particular description, I provide a plurality of sheaths or rectilinear supporting-strips 5 adapted to be disposed below and transversely of the body of a vehicle 6, said sheaths being disposed approximately parallel and adjacent to each other, each having a length equal to the distance between the outer edges of the running-boards 7 of the vehicle. I also provide a pair of frames 8, each being substantially of L-shape in side elevation, each frame consisting of a plurality of strips or bars 9 bent to an L-shape to provide rectilinear engaging-members 10 and upright holder-members 11, the latter being connected by means of cross-strips 12.

The sheaths 5 may be secured to the running-boards to remain thereon permanently, bolts 13 being used for this purpose as best shown in Fig. 2.

The sheaths mentioned may be mounted upon automobiles of ordinary construction since the space required for them is not usually occupied by other parts, and may be mounted upon motor vehicles generally, and since the ends of the sheaths terminate flush with the outer edges of the running-boards they will not obtrude and will not interfere materially with the uses of said running-boards.

It will be understood that each strip or bar 9, in order to provide the frames mentioned, should be approximately of L-shape. When connected by the cross-strips, as shown, they provide a pair of frames adapted for a great variety of uses at the respective sides of the vehicle, the space between members 10 of each frame corresponding approximately to the space between the sheaths.

The frames may be readily mounted upon the vehicle, members 10 being inserted in the sheaths, said members 10 being adapted to have slidable movements therein, the upright holder-members 11, on account of this adjustment being adapted to be disposed nearer to or farther from a running-board, as may be required.

Numerals 14 indicate a pair of wings, each being rectangular in form and having a hingeable connection 15 with members 10 and 11 at their junction, as best shown in Fig. 3. These wings are preferably provided with wire mesh, as best shown in Fig. 1, and it is obvious that they are adapted to be swung downwardly to lie upon members 10 to form a suitable web for use in some instances, or may be swung upwardly to a vertical position to lie against members 11, loops 16 preferably being provided for said wings for removably securing them to the upright members 11.

The attachments as described are very useful when carrying trunks, merchandise or portable articles, and are adapted for use as supports for bedding when motor vehicles are used for campers or excursionists when improvised beds are desired.

It will be appreciated that the sheaths may be conveniently applied to vehicles since the running-boards to which they are secured are readily accessible. The frames 8 may be removed from the sheaths when their use is not required; also their use does not operate to prevent ingress to or egress from the vehicle, since they are slidably mounted in the sheaths and may be moved outwardly from the running-boards.

While I have shown sheaths and described T-bars in the construction of the device I do not wish to limit myself in this respect, and may substitute equivalent members therefor, also I may change the size, proportion and form of parts, the character and degree of such changes being within the scope of the invention as claimed.

I claim:

In an attachment for a vehicle having running-boards projecting outwardly of its sides, rectilinear sheaths adapted to be disposed transversely of the vehicle and to terminate in the planes of the running-boards, a pair of L-shaped frames each having horizontal parts engaging within and adapted to have slidable movements to project outwardly of the terminals of the sheaths and having upright, connected parts provided at their upper ends with loops, a pair of wings each being connected with a frame at the junction of its horizontal and upright parts and adapted to be swung to a horizontal position to lie upon the frame outwardly of a running-board and to have a swinging movement to an upright position to permit engagement with said loops.

In testimony whereof I have affixed my signature in presence of two witnesses.

AXEL E. OLANDER.

Witnesses:
HIRAM A. STURGES,
CHARLES M. MARSH.